United States Patent [19]

Foote et al.

[11] Patent Number: 6,167,535
[45] Date of Patent: Dec. 26, 2000

[54] OBJECT HEAP ANALYSIS TECHNIQUES FOR DISCOVERING MEMORY LEAKS AND OTHER RUN-TIME INFORMATION

[75] Inventors: William F. Foote, Cupertino; Jeffrey D. Nisewanger, San Jose, both of Calif.

[73] Assignee: Sun Microsystems, Inc., Palo Alto, Calif.

[21] Appl. No.: 09/060,226

[22] Filed: Apr. 14, 1998

Related U.S. Application Data

[60] Provisional application No. 60/067,993, Dec. 9, 1997.

[51] Int. Cl.⁷ .................................................. H02H 3/05
[52] U.S. Cl. .................................................. 714/38; 717/4
[58] Field of Search .................................. 709/300, 303; 714/57, 38; 395/701; 717/4

[56] References Cited

U.S. PATENT DOCUMENTS

| 5,606,661 | 2/1997 | Wear et al. | 714/38 |
| 5,740,440 | 4/1998 | West | 717/4 |

OTHER PUBLICATIONS

Foote, Bill. "HAT–The Java Heap Ananlysis Tool" found at developer.java.sun.com/developer/early/Access/hat/README.html Dec. 16, 1999.

Meyer, Bartrand "Object–oriented Software Construction" Prentice Hall International Series in Computer Science 1988 p. 368.

The Microsoft Press Computer Dictionary, Microsoft Press, Redmond, Washington, 1997, p. 238,239,268,269337–339.

www.turbopower.com/products/sleuth–bcb/.

www.visicomp.com/products/zoom.html.

www.metamata.com/products/debug_top.html.

*Primary Examiner*—Robert W. Beausoliel, Jr.
*Assistant Examiner*—Bryce Bonzo
*Attorney, Agent, or Firm*—Beyer Weave & Thomas, LLP

[57] ABSTRACT

Techniques for analyzing object-oriented computer programs are provided. A snapshot of the objects that are active at a specific point in time during execution may be stored. An analysis tool may be utilized to generate hypertext documents that allow a user to analyze the active objects. Additionally, a user may compare two different snapshots of active objects at two different run-times so that, for example, new instances of a class may be easily identified.

44 Claims, 28 Drawing Sheets

ALL CLASSES

Package <Default Package> class char
class double
class float
class int

Package java.applet class java.applet.Applet

Package java.awt class java.awt.AWTEvent
class java.awt.BorderLayout
class java.awt.Canvas
class java.awt.Color
class java.awt.Component
class java.awt.Container
class java.awt.Cusor
class java.awt.Dimension
class java.awt.Event
class java.awt.EventDispatchThread
class java.awt.EventQueue
class java.awt.EventQueueItem
class java.awt.FlowLayout
class java.awt.FocusManager
class java.awt.Font
class java.awt.Frame
class java.awt.Graphics
class java.awt.GridBagConstraints
class java.awt.GridBagLayout
class java.awt.GridBagLayoutInfo
class java.awt.Image
class java.awt.Insets
class java.awt.LayoutManager
class java.awt.LayoutManger2
class java.awt.LightweightDispatcher
class java.awt.MenuContainer
class java.awt.Panel
class java.awt.Point
class java.awt.Polygon
class java.awt.Rectangle
class java.awt.ScrollPane
class java.awt.Shape
class java.awt.Toolkit

FIG. 8A class java.awt.Window

Package java.awt.event class java.awt.event.ComponentEvent
class java.awt.event.FocusEvent
class java.awt.event.InputEvent
class java.awt.event.KeyEvent
class java.awt.event.MouseEvent
class java.awt.event.PaintEvent
class java.awt.event.WindowEvent Package java.awt.image class java.awt.image.ImageConsumer
class java.awt.image.ImageObserver
class java.awt.image.ImageProducer Package java.awt.peer class java.awt.peer.CanvasPeer
class java.awt.peer.ComponentPeer
class java.awt.peer.ContainerPeer
class java.awt.peer.FontPeer
class java.awt.peer.FramePeer
class java.awt.peer.LightweightPeer
class java.awt.peer.PanelPeer
class java.awt.peer.WindowPeer Package java.io class java.io.BufferedInputStream
class java.io.BufferedWriter
class java.io.File
class java.io.FileDescriptor
class java.io.FileInputStream
class java.io.FileOutputStream
class java.io.FilterInputStream
class java.io.FilterOutputStream
class java.io.InputStream
class java.io.OutputStream
class java.io.OutputStreamWriter
class java.io.PrintStream
class java.io.Serializable
class java.io.Writer

FIG. 8B

Package java.lang class java.lang.Character
class java.lang.Class
class java.lang.Cloneable
class java.lang.Double
class java.lang.Float
class java.lang.Integer
class java.lang.Math
class java.lang.Number
class java.lang.Object
class java.lang.Runnable
class java.lang.Runtime
class java.lang.String
class java.lang.StringBuffer
class java.lang.System
class java.lang.System$DelegatingInputStream
class java.lang.System$DelegatingPrintStream
class java.lang.Thread
class java.lang.ThreadGroup Package java.util class java.util.Dictionary
class java.util.EventObject
class java.util.Hashtable
class java.util.HashtableEntry
class java.util.Locale
class java.util.Properties
class java.util.Random
class java.util.Vector Package jovial.slotCar class jovial.slotCar.Car
class jovial.slotCar.GasPedal
class jovial.slotCar.RaceApplet
class jovial.slotCar.RaceView
class jovial.slotCar.RandomGasPedal Package jovial.slotCar.animator class jovial.slotCar.animator.Animatee
class jovial.slotCar.animator.Animator
class jovial.slotCar.animator.Drawable

FIG. 8C

Package jovial.slotCar.track class jovial.slotCar.track.CurvedTrackSegment
class jovial.slotCar.track.FigureEightTrack
class jovial.slotCar.track.StraightTrackSegment
class jovial.slotCar.track.Track
class jovial.slotCar.track.TrackPosition
class jovial.slotCar.track.TrackSegment  — 503

Package sun.awt class sun.awt.AWTFinalizeable
class sun.awt.AWTFinalizer
class sun.awt.CharToByteSymbol
class sun.awt.DrawingSurface
class sun.awt.EmbeddedFrame
class sun.awt.FontDescriptor
class sun.awt.PlatformFont
class sun.awt.ScreenUpdater
class sun.awt.ScreenUpdaterEntry
class sun.awt.SunToolkit
class sun.awt.UpdateClient Package sun.awt.image class sun.awt.image.Image
class sun.awt.image.ImageFetchable
class sun.awt.image.ImageRepresentation
class sun.awt.image.ImageWatched
class sun.awt.image.InputStreamImageSource
class sun.awt.image.OffScreenImageSource Package sun.awt.motif class sun.awt.motif.CharToByteX11Dingbats
class sun.awt.motif.InputThread
class sun.awt.motif.MCanvasPeer
class sun.awt.motif.MComponentPeer
class sun.awt.motif.MEmbeddedFrame
class sun.awt.motif.MFontPeer
class sun.awt.motif.MFramePeer
class sun.awt.motif.MPanelPeer
class sun.awt.motif.MTookit
class sun.awt.motif.X11Graphics
class sun.awt.motif.X11Image
class sun.awt.motif.X11OffScreenImage

FIG. 8D

Package sun.io class sun.io.CharToByte8859_1
class sun.io.CharToByteConverter
class sun.io.CharacterEncoding Package <Arrays>
class [I Other Queries ● Show all members of the rootset ← 705

FIG. 8E

Class jovial.slotCar.track.TrackSegment class jovial.slotCar.track.TrackSegment Superclass:

class jovial.slotCar.animator.Drawable

Subclasses:

class jovial.slotCar.track.CurvedTrackSegment
class jovial.slotCar.track.StraightTrackSegment Instance Data Members:

color_(Ljava/awt/Color;)
height_(I)
next_(Ljovial/slotCar/track/TrackSegment;)

Static Data Members:

Instances

Exclude subclasses  ← 553
Include subclasses  ↘
                    575

FIG. 9

Instances of jovial.slotCar.Car class jovial.slotCar.Car jovial.slotCar.Car@0xee704610 (24bytes)
jovial.slotCar.Car@0xee7043e0 (24bytes)

607

Instances of jovial.slotCar.Car (including subclasses)

class jovial.slotCar.Car jovial.slotCar.Car@0xee704610 (24bytes)
jovial.slotCar.Car@0xee7043e0 (24 bytes)

Object at 0xee704610 instance of jovial.slotCar.Car (24 bytes)

Class:

class jovial.slotCar.Car

Instance data members:

drawColor_(Ljava/awt/Color;) :java.awt.Color@0xee703fa8 (12 bytes)
eraseColor_(Ljava/awt/Color;) :java.awt.Color@0xee703fc8 (12bytes)
gasPedal_(Ljovial/slotCar/GasPedal;) :jovial.slotCar.RandomGasPedal@0xee704608 (20 bytes)
poly_(Ljava/awt/Polygon;) :java.awt.Polygon@0xee7045f0 (20 bytes)
pos_(Ljovial/slotCar/track/TrackPosition;) :jovial.slotCar.track.TrackPosition@0xee704620 (32 bytes)

References to this object:

array@0xee704408 (12 bytes) : Element 1 of array
array@0xee704010 (44 bytes) : Element 7 of array Other Queries Reference Chains from Rootset

- Exclude weak refs
- Include weak refs

Objects reachable from here

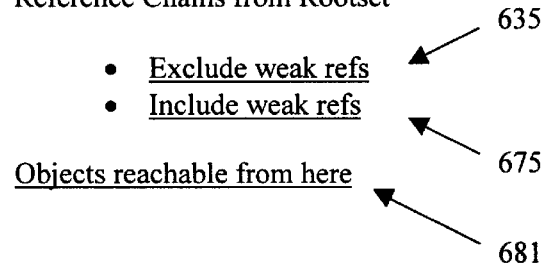

FIG. 12

Rootset references to jovial.slotCar.Car
(excludes weak refs)

References to jovial.slotCar.Car@0xee704610 (24 bytes)

Java Local References

Java stack local (from java.lang.Thread):

→ jovial.slotCar.animator.Animator@0xee704058 (120 bytes) (field animatee_:)
→ jovial.slotCar.RaceView@0xee703ff8 (8byes) (field cars_:)
→ array@0xee704408 (12 bytes) (Element 1 of array:)
→ jovial.slotCar.Car@0xee704610 (24 bytes)

Other queries

Include weak refs 
⬉
    691

FIG. 13

Rootset references to jovial.slotCar.Car
(includes weak refs)

References to jovial.slotCar.Car@0xee704610 (24 bytes)

Java Local References

Java stack local (from java.lang.Thread):

→ jovial.slotCar.animator.Animator@0xee704058 (120 bytes) (field animatee_:)
→ jovial.slotCar.RaceView@0xee703ff8 (8 bytes) (field cars_:)
→ array@0xee704408 (12 bytes) (Element 1 of array:)
→ jovial.slotCar.Car@0xee704610 (24 bytes)

Other queries

Exclude weak refs ← 693

FIG. 14

Objects Reachable From 0xee704610 jovial.slotCar.Car@0xee704610 (24 bytes)

jovial.slotCar.track.StraightTrackSegment@0xee704398 (88 bytes)
   jovial.slotCar.track.StraightTrackSegment@0xee7041b8 (88 bytes)
   jovial.slotCar.track.StraightTrackSegment@0xee7044d0 (88 bytes)
   jovial.slotCar.track.StraightTrackSegment@0xee7043b8 (88 bytes)
   jovial.slotCar.track.CurvedTrackSegment@0xee7043a0 (60 bytes)
   jovial.slotCar.track.CurvedTrackSegment@0xee7041c8 (60 bytes)
   jovial.slotCar.track.CurvedTrackSegment@0xee704418 (60 bytes)
   jovial.slotCar.track.TrackPosition@0xee704620 (32 bytes)
   <array>@0xee704138 (20 bytes)
   <array>@0xee704130 (20 bytes)
   <array>@0xee704460 (20 bytes)
   <array>@0xee704358 (20 bytes)
   <array>@0xee7045d0 (20 bytes)
   <array>@0xee7043b0 (20 bytes)
   <array>@0xee7044d8 (20 bytes)
   <array>@0xee7045d8 (20 bytes)
   <array>@0xee7042e8 (20 bytes)
   <array>@0xee7043a8 (20 bytes)
   <array>@0xee704420 (20 bytes)
   <array>@0xee704168 (20 bytes)
   <array>@0xee7044e0 (20 bytes)
   <array>@0xee704268 (20 bytes)
   <array>@0xee7042a8 (20 bytes)
   <array>@0xee704170 (20 bytes)
   <array>@0xee7042a0 (20 bytes)
   <array>@0xee704360 (20 bytes)
   <array>@0xee704490 (20 bytes)
   <array>@0xee7042f0 (20 bytes)
   <array>@0xee704320 (20 bytes)
   <array>@0xee704328 (20 bytes)
   <array>@0xee704498 (20 bytes)
   <array>@0xee704510 (20 bytes)
   <array>@0xee704428 (20 bytes)
   <array>@0xee704270 (20 bytes)
   java.awt.Polygon@0xee704288 (20 bytes)
   java.awt.Polygon@0xee704308 (20 bytes)
   java.awt.Polygon@0xee7042c0 (20 bytes)
   java.awt.Polygon@0xee704340 (20 bytes)
   java.awt.Polygon@0xee704260 (20 bytes)
   java.awt.Polygon@0xee704188 (20 bytes)
   java.awt.Polygon@0xee7044b0 (20 bytes)
   java.awt.Polygon@0xee7045f0 (20 bytes)

FIG. 15A java.awt.Polygon@0xee7044f8 (20 bytes)
java.awt.Polygon@0xee704440 (20 bytes)
java.awt.Polygon@0xee704118 (20 bytes)
java.awt.Polygon@0xee704378 (20 bytes)
java.awt.Polygon@0xee704478 (20 bytes)
jovial.slotCar.RandomGasPedal@0xee704608 (20 bytes)
array@0xee704390 (12 bytes)
array@0xee7041a0 (12 bytes)
array@0xee7042d8 (12 bytes)
array@0xee7044c8 (12 bytes)
java.awt.Color@0xee703fa8 (12 bytes)
java.awt.Color@0xee703fc8 (12 bytes)
java.awt.Point@0xee706e58 (12 bytes)

Total size: 1472 bytes.

FIG. 15B

All Members of the Rootset

Java Static References

Static reference from java.awt.BorderLayout.CENTER:
→ java.lang.String@0xee703e58 (16 bytes)
Static reference from java.awt.BorderLayout.EAST:
→ java.lang.String@0xee703e78 (16 bytes)
Static reference from java.awt.BorderLayout.NORTH:
→ java.lang.String@0xee703e98 (16 bytes)
Static reference from java.awt.BorderLayout.SOUTH:
→ java.lang.String@0xee703e88 (16 bytes)
Static reference from java.awt.BorderLayout.WEST:
→ java.lang.String@0xee703e68 (16 bytes)
Static reference from java.awt.Canvas.base:
→ java.lang.String@0xee704060 (16 bytes)
Static reference from java.awt.Color.black:
→ java.awt.Color@0xee703fc8 (12 bytes)
Static reference from java.awt.Color.blue:
→ java.awt.Color@0xee704240 (12 bytes)
Static reference from java.awt.Color.cyan:
→ java.awt.Color@0xee704248 (12 bytes)
Static reference from java.awt.Color.darkGray:
→ java.awt.Color@0xee703fd0 (12 bytes)
Static reference from java.awt.Color.gray:
→ java.awt.Color@0xee703fd8 (12 bytes)
Static reference from java.awt.Color.green:
→ java.awt.Color@0xee703fa0 (12 bytes)
Static reference from java.awt.Color.lightGray:
→ java.awt.Color@0xee703fe0 (12 bytes)
Static reference from java.awt.Color.magenta:
→ java.awt.Color@0xee704250 (12 bytes)
Static reference from java.awt.Color.orange:
→ java.awt.Color@0xee703fb0 (12 bytes)
Static reference from java.awt.Color.pink:
→ java.awt.Color@0xee703fb8 (12 bytes)
Static reference from java.awt.Color.red:
→ java.awt.Color@0xee703fc0 (12 bytes)
Static reference from java.awt.Color.white:
→ java.awt.Color@0xee703fe8 (12 bytes)
Static reference from java.awt.Color.yellow:
→ java.awt.Color@0xee703fa8 (12 bytes)
Static reference from java.awt.Component.LOCK
→ java.lang.Object@0xee703d20 (4bytes)
Static reference from java.awt.Component.actionListenerK:
→ java.lang.String@0xee703dd8 (16 bytes)

FIG. 16A

Static reference from java.awt.Component.adjustmentListenerK:
→ java.lang.String@0xee703dc8 (16 bytes)
Static reference from java.awt.Component.componentListenerK:

- •
- •
- •

Static reference from sun.io.CharToByteConverter.pkgString:
→ java.lang.String@0xee700538 (16 bytes)
Static reference from sun.io.CharacterEncoding.aliasTable:
→ java.util.Hashtable@0xee7005c8 (20 bytes)

Java Local References

Java stack local (from sun.awt.ScreenUpdater):
→ sun.awt.ScreenUpdater@0xee707c28 (52 bytes)
Java stack local (from java.lang.Thread):
→ sun.awt.motif.X11Graphics@0xee707a60 (36 bytes)
Java stack local (from java.awt.EventDispatchThread):
→ java.awt.EventDispatchThread@0xee7052e8 (56 bytes)
Java stack local (from java.lang.Thread):
→ jovial.slotCar.animator.Animator@0xee704058 (120 bytes)
Java stack local (from sun.awt.ScreenUpdater):
→ sun.awt.ScreenUpdater@0xee707c28 (52 bytes)
Java stack local (from java.lang.Thread):
→ sun.awt.motif.MToolkit@0xee705368 (8 bytes)
Java stack local (from java.awt.EventDispatchThread):
→ java.awt.EventQueue@0xee705338 (8 bytes)
Java stack local (from sun.awt.ScreenUpdater):
→ sun.awt.ScreenUpdater@0xee707c28 (52 bytes)
Java stack local (from sun.awt.ScreenUpdater):
→ java.lang.ThreadGroup@0xee703ba8 (44 bytes)
Java stack local (from java.awt.EventDispatchThread):
→ java.awt.event.FocusEvent@0xee707648 (24 bytes)
Java stack local (from java.awt.EventDispatchThread):
→ jovial.slotCar.animator.Animator@0xee704058 (120 bytes)
Java stack local (from java.lang.Thread):
→ sun.awt.motif.MToolkit@0xee705368 (8 bytes)
Java stack local (from java.awt.EventDispatchThread):
→ java.awt.EventQueue@0xee705338 (8 bytes)
Java stack local (from java.lang.Thread):
→ sun.awt.motif.X11Graphics@0xee707a48 (36 bytes)
Java stack local (from java.awt.EventDispatchThread):
→ java.awt.EventQueue@0xee705338 (8 bytes)
Java stack local (from java.awt.EventDispatchThread):
→ java.awt.event.FocusEvent@0xee707648 (24 bytes)

FIG. 16B

Java stack local (from java.lang.Thread):

→ sun.awt.motif.MCanvasPeer@0xee707580 (16 bytes)
Java stack local (from sun.awt.AWTFinalizer):
→ sun.awt.AWTFinalizer@0xee707e08 (48 bytes)
Java stack local (from java.lang.Thread):
→ java.lang.Thread@0xee7052b0 (48 bytes)
Java stack local (from java.lang.Thread):
→ sun.awt.motif.X11OffScreenImage@0xee707ad0 (32 bytes)
Java stack local (from sun.awt.AWTFinalizer):
→ sun.awt.AWTFinalizer@0xee707e08 (48 bytes)
Java stack local (from java.lang.Thread):
→ java.lang.Thread@0xee7077c8 (48 bytes)
Java stack local (from sun.awt.AWTFinalizer):
→ sun.awt.AWTFinalizer@0xee707e08 (48 bytes)
Java stack local (from sun.awt.AWTFinalizer):
→ sun.awt.AWTFinalzier@0xee707e08 (48 bytes)
Java stack local (from sun.awt.ScreenUpdater):
→ sun.awt.ScreenUpdater@0xee707c28 (52 bytes)

Native Static References

Native code reference:
→ sun.awt.AWTFinalizer@0xee707e08 (48 bytes)
Native code reference:
→ java.lang.Thread@0xee7000b0 (48 bytes)
Native code reference:
→ java.lang.Thread@0xee703e20 (48 bytes)
Native code reference:
→ java.awt.EventDispatchThread@0xee7052e8 (56 bytes)
Native code reference:
→ sun.awt.ScreenUpdater@0xee707c28 (52 bytes)
Native code reference:
→ java.lang.Thread@0xee703c48 (48 bytes)
Native code reference:
→ java.lang.Thread@0xee700088 (48 bytes)
Native code reference:
→ java.lang.Thread@0xee703c90 (48 bytes)
Native code reference:
→ java.lang.Thread@0xee7077c8 (48 bytes)
Native code reference:
→ sun.awt.motif.InputThread@0xee7052d0 (48 bytes)
Native code reference:
→ java.lang.Thread@0xee703a08 (48 bytes)
Native code reference:
→ javal.lang.Thread@0xee7052b0 (48 bytes)

FIG. 16C

Native Local References

Native code reference (from java.awt.EventDispatchThread):
→ java.awt.EventQueue@0xee705338 (8 bytes)
Native code reference(from java.lang.Thread):
→ sun.awt.motif.MToolkit@0xee705368 (8bytes)
Native code reference(from java.lang.Thread):
→ java.lang.Thread@0xee703c48 (48 bytes)
Native code reference (from java.lang.Thread):
→ array@0xee703f88 (4 bytes)
Native code reference (from java.awt.EventDispatchThread):
→ java.awt.EventQueue@0xee705338 (8 bytes)
Native code reference (from java.lang.Thread):
→ array@0xee703f88 (4 bytes)
Native code reference (from sun.awt.motif.InputThread):

• 
• 
•

→ sun.awt.AWTFinalizer@0xee707e08 (48 bytes)
Native code reference (from java.awt.EventDispatchThread):
→ java.awt.EventDispatchThread@0xee7052e8 (56 bytes)
Native code reference (from java.lang.Thread):
→ java.lang.Thread@0xee7077c8 (48 bytes)
Native code reference (from java.awt.EventDispatchThread):
→ java.awt.EventQueue@0xee705338 (8 bytes)
Native code reference (from sun.awt.motif.InputThread):
→ sun.awt.motif.InputThread@0xee7052d0 (48 bytes)
Native code reference (from java.awt.EventDispatchThread):
→ java.awt.Event@0xee707078 (56 bytes)
Native code reference (from java.lang.Thread):
→ java.lang.Thread@0xee703c90 (48 bytes)
Native code reference (from java.awt.EventDispatchThread):
→ java.awt.Event@0xee7075c8 (56 bytes)
Native code reference (from java.lang.Thread):
→ java.lang.Thread@0xee7052b0 (48 bytes)
Native code reference (from sun.awt.motif.InputThread):
→ sun.awt.motif.InputThread@0xee7052d0 (48 bytes)
Native code reference (from java.lang.Thread):
→ java.lang.Thread@0xee703c90 (48 bytes)
Native code reference (from sun.awt.motif.InputThread):
→ sun.awt.motif.InputThread@0xee7052d0 (48 bytes)
Native code reference (from java.lang.Thread):
→ java.lang.Thread@0xee703c90 (48 bytes)
Native code reference (from sun.awt.motif.InputThread):
→ sun.awt.motif.InputThread@0xee7052d0 (48 bytes)
Native code reference (from java.lang.Thread):

FIG. 16D

→ java.lang.Thread@0xee7052b0 (48 bytes)
Native code reference (from sun.awt.AWTFinalizer):
→ sun.awt.AWTFinalizer@0xee707e08 (48 bytes)
Native code reference (from java.lang.Thread):
→ java.lang.Thread@0xee703c90 (48 bytes)
Native code reference (from java.lang.Thread):
→ java.lang.Thread@0xee7077c8 (48 bytes)
Native code reference (from java.lang.Thread):
→ java.awt.Point@0xee706e08 (12 bytes)
Native code reference (from java.lang.Thread):
→ java.lang.Thread@0xee7077c8 (48 bytes)
Native code reference (from java.lang.Thread):
→ java.lang.Thread@0xee7052b0 (48 bytes)
Native code reference (from java.lang.Thread):
→ java.lang.Thread@0xee7077c8 (48 bytes)
Native code reference (from java.lang.Thread):
→ java.lang.Thread@0xee703a08 (48 bytes)
Native code reference (from java.lang.Thread):
→ java.lang.Thread@0xee703a08 (48 bytes)

Other Queries

• Show All Classes          ◄
                    ╲
                     ╲ 715

FIG. 16E

New instances of java.awt.Point class java.awt.Point ← 801 java.awt.Point@0xee706e58[new] (12 bytes)
java.awt.Point@0xee706e48[new] (12 bytes)   } 803
java.awt.Point@0xee706e08[new] (12 bytes)

FIG. 18

New instances of java.lang.Object (including subclasses)

class java.lang.Object java.awt.Point@0xee706e58[new] (12 bytes)
java.awt.Point@0xee706e48[new] (12 bytes)
java.awt.Point@0xee706e08[new] (12 bytes)

FIG. 19

.BOD FILE STRUCTURE
@(#) bod_format.txt

This document gives the file format of a bod ("binary object dump") file. In this version, reported data types include int, char array, and reference – fields of other types simply aren't reported. This description is in an informal BNF-style syntax, where sometimes a symbol in a grammar is given by itself (i.e. "class"), and sometimes it is given following a descriptive name and a colon (i.e. statics:: static_field[]). The array syntax means "zero or more of this element".

A "thing" (like a class or an object) may appear in the dump file more than once. This rule is intended primarily to make the VM implementation that produces the file easier. If a thing appears twice, it is expected that it will have the same values, except, perhaps for the root_flags and the thread_id. The set of root of an object is the union of the roots specified by all occurrences of the object in the union of the roots specified by all occurrences of the object in the file (i.e. if an object is referred to by two local variables in two different threads, it will appear at least twice in the file, with an entry indicating each local variable root appearing at least once).

bod file ::= magic_number version_number thing[]

magic_number ::= 0x0b0dd00d version_number ::= 4 thing ::= type:byte id:int root_flags:byte thread_id:int stuff type is object=0, class=1, object array=2, char array=3, other array=4
    root_flags is static=1, java stack local=2, native ref=4
    thread_id is id field of the thread object responsible for this being a root, or 0 if not applicable stuff := object | class | object_array | char_array object ::= class_id : int
       num_fields :int
       data : int[]

data is the value of int fields, or the id of object/array fields

FIG. 20A

```
class ::= superclass_id : int
          name_len : int
          num_statics : int
          statics : static_field[]
          num_fields : int
          fields : field[]
          instance_size : int              // in bytes, including VM overhead field ::= name_len : int
          name : char[]
          signature_len : int
          signature : char[]

static_field ::= field
                 value : int               // value is value of int field, or id of object object_array ::= size : int                // in bytes, including VM overhead
                 len : int
                 object_id : int[]

char_array ::= size : int
               len : int
               data : char[]

Other_array ::= size : int
```

FIG. 20B

OBJECT HEAP ANALYSIS TECHNIQUES FOR DISCOVERING MEMORY LEAKS AND OTHER RUN-TIME INFORMATION

This patent application claims priority under 35 U.S.C. § 119(e) to provisional Application No. 60/067,993, filed Dec. 9, 1997, which is hereby incorporated by reference for all purposes.

BACKGROUND OF THE INVENTION

The present invention relates to techniques for analyzing (e.g., optimization, locating errors or "debugging") software applications. More specifically, the invention relates to techniques for storing information about objects existing during run-time of an application on a Java™ virtual machine for later analysis.

The Java™ programming language is an object-oriented high level programming language developed by Sun Microsystems and designed to be portable enough to be executed on a wide range of computers ranging from small devices (e.g., pagers, cell phones and smart cards) up to supercomputers. Computer programs written in Java (and other languages) may be compiled into virtual machine instructions for execution by a Java virtual machine. In general the Java virtual machine is an interpreter that decodes and executes the virtual machine instructions.

The virtual machine instructions for the Java virtual machine are bytecodes, meaning they include one or more bytes. The bytecodes are stored in a particular file format called a "class file" that includes bytecodes for methods of a class. In addition to the bytecodes for methods of a class, the class file includes a symbol table as well as other ancillary information.

A computer program embodied as Java bytecodes in one or more class files is platform independent. The computer program may be executed, unmodified, on any computer that is able to run an implementation of the Java virtual machine. The Java virtual machine is a software emulator of a "generic" computer that is a major factor in allowing computer programs for the Java virtual machine to be platform independent.

The Java virtual machine is commonly implemented as a software interpreter. Conventional interpreters decode and execute the virtual machine instructions of an interpreted program one instruction at a time during execution, which is in contrast to compilers that decode source code into native machine instructions prior to execution so that decoding is not performed during execution. Typically, the Java virtual machine will be written in a programming language other than the Java programming language (e.g., the C++ programming language). Therefore, execution of a Java program may involve execution of functions written in multiple programming languages. Additionally, the bytecodes themselves may call functions (e.g., system functions for input/output) that are not written in the Java programming language. It is therefore common for an executing Java program to entail the execution of functions that were written in multiple programming languages.

Although it is a goal of object-oriented programs to allow for the reuse of tested source code and therefore a reduction in the number of run-time errors, Java programs may still benefit from analysis techniques that provide a window into the operation of the program during run-time. For example, the analysis may be utilized to optimize the program or locate bugs in the code. Accordingly, it would be desirable to provide innovative techniques of analyzing applications executing on a Java virtual machine. Additionally, it would be beneficial to provide a snapshot of objects that exist during run-time of an application so that, for example, memory leaks may be detected.

SUMMARY OF THE INVENTION

In general, embodiments of the present invention provide innovative techniques for analyzing object-oriented computer programs. A snapshot of the objects that are active ("active objects") at a specific point in time during execution may be stored. An analysis tool may be utilized to generate hypertext documents that allow a user to analyze the active objects. As an example, a user may be able to identify memory leaks by browsing through HyperText Markup Language (HTML) documents and determining that there are too many instances of a class than is expected. The user may then follow the references (or pointers) to the unnecessary instances in order to determine what is causing the memory leak. Additionally, a user may compare two different snapshots of active objects at two different run-times so that, for example, new instances of a class may be easily identified. Several embodiments of the invention are described below.

In one embodiment, a computer-implemented method for analyzing the execution of an object-oriented program includes receiving input during run-time to store information regarding active objects. In order to locate the active objects, the system may begin scanning active objects beginning with objects that are a member of the root set of objects. Then, objects that referenced by the root set of objects may be identified, and objects that are referenced by these objects, and so on until all the active objects are identified. Information regarding the active objects may be stored (e.g., in a file). In preferred embodiments, the active objects are instances of Java classes.

In another embodiment, a computer-implemented method for analyzing the execution of an object-oriented program includes retrieving information regarding active objects at a point in time in the execution. The information may be recursively scanned to identify objects that are members of the root set and maintain the hierarchy of the active objects. A hypertext document may be generated to present the information regarding the active objects to a user for analysis.

In another embodiment, a computer-implemented method for analyzing the execution of an object-oriented program includes storing information regarding active objects at two different run-times. The differences between the first and second run-times, e.g., new instances, may then be determined. A hypertext document may be generated to present the differences to a user for analysis.

Other features and advantages of the invention will become readily apparent upon review of the following detailed description in association with the accompanying drawings.

BRIEF DESCRIPTION OF THE DRAWINGS

FIGS. 8A–8E show a hypertext document of all classes that had instances that were active when the snapshot was taken.

FIG. 9 shows a hypertext document of a class that had instances that were active when the snapshot was taken.

FIG. 12 shows a hypertext document of information regarding an active object.

FIG. 13 shows a hypertext document of root set references to an active object that excludes weak references.

FIG. 14 shows a hypertext document of root set references to an active object that includes weak references.

FIGS. 15A and 15B show a hypertext document of all objects reachable from an active object.

FIGS. 16A–16E show a hypertext document of all members of the root set.

FIG. 18 shows a hypertext document of new instances of a class.

FIG. 19 shows a hypertext document of new instances of a class including subclasses.

FIGS. 20A–20B describe a data structure that may be utilized to store information regarding active objects.

DETAILED DESCRIPTION OF PREFERRED EMBODIMENTS

Definitions

Class—An object-oriented data type that defines objects that share the same characteristics, typically including both data and functions that operate on the data.

Object (or instance)—An instantiated member of a class.

Root set of objects—Objects that may be referenced directly without chaining through other objects.

Active object—An object that has been instantiated and is a member of the root set or may be referenced by members of the root set either directly, or indirectly.

Native methods (or code)—Functions that are written in a programming language ther than the Java programming language.

Overview

In the description that follows, the present invention will be described in reference to preferred embodiments that analyze the execution of a Jav;a program (e.g., bytecodes) during execution. In particular, examples will be described in which the Java virtual machine is written in the C++ programming language. However, the invention is not limited to any particular language, computer architecture, or specific implementation. Therefore, the description of the embodiments that follow is for purposes of illustration and not limitation.

Figure 1:
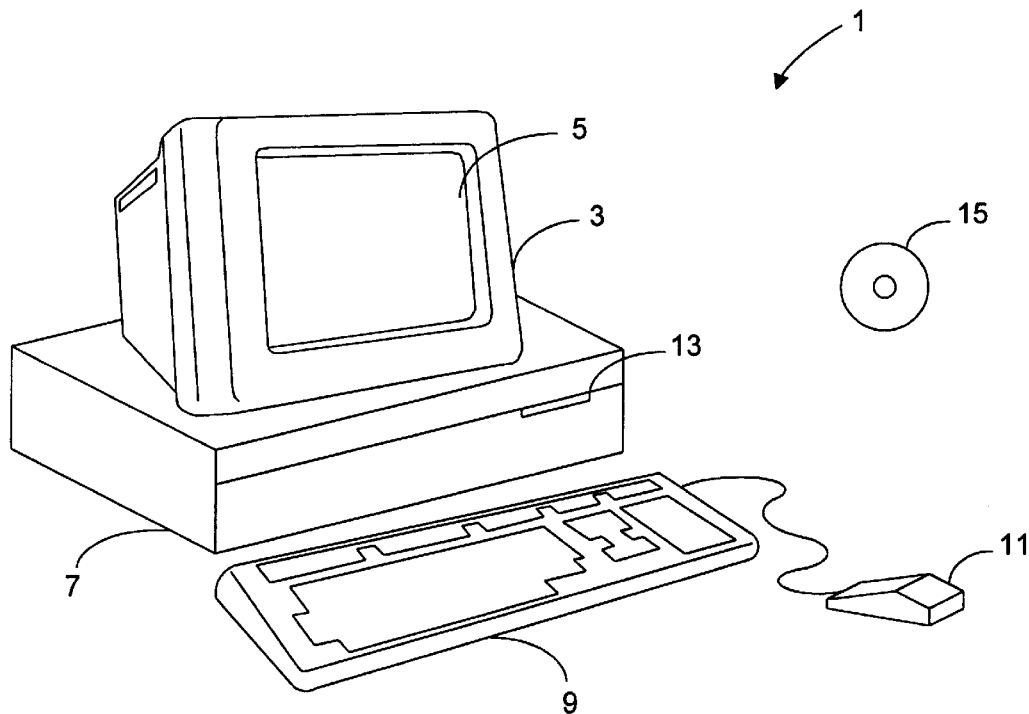
FIG. 1 illustrates an example of a computer system that may be utilized to execute the software of an embodiment of the invention.

FIG. 1 illustrates an example of a computer system ihat may be used to execute the software of an embodiment of the invention. FIG. 1 shows a computer system 1 that includes a display 3, screen 5, cabinet 7, keyboard 9, and mouse 11. Mouse 11 may have one or more buttons for interacting with a graphical user interface. Cabinet 7 houses a CD-ROM drive 13, system memory and a hard drive (see FIG. 2) which may be utilized to store and retrieve software programs incorporating computer code that implements the invention, data for use with the invention, and the like. Although the CD-ROM 15 is shown as an exemplary computer readable storage medium, other computer readable storage media including floppy disk, tape, flash memory, system memory, and hard drive may be utilized. Additionally, a data signal embodied in a carrier wave (e.g., in a network including the Internet) may be the computer readable storage medium.

Figure 2:
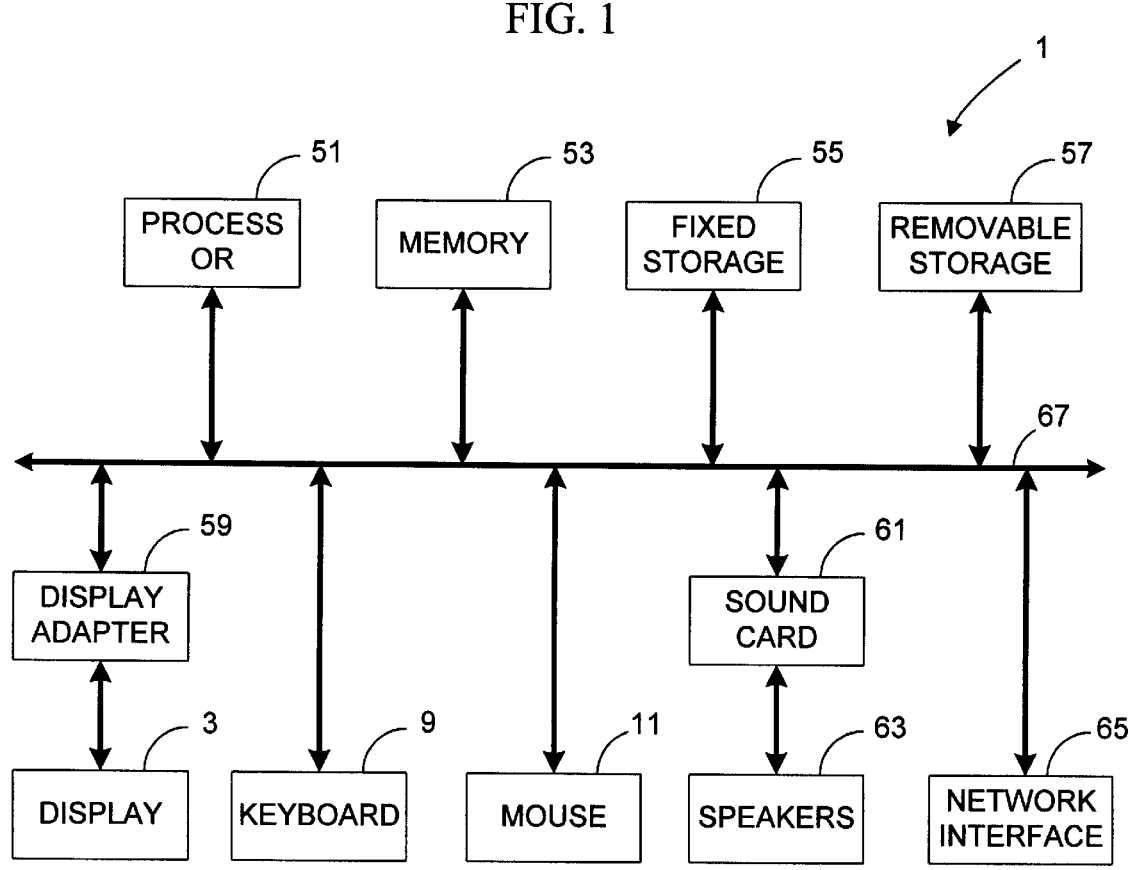
FIG. 2 shows a system block diagram of the computer system of FIG. 1.

FIG. 2 shows a system block diagram of computer system 1 used to execute the software of an embodiment of the invention. As in FIG. 1, computer system 1 includes monitor 3 and keyboard 9, and mouse 11. Computer system 1 further includes subsystems such as a central processor 51, system memory 53, fixed storage 55 (e.g., hard drive), removable storage 57 (e.g., CD-ROM drive), display adapter 59, sound card 61, speakers 63, and network interface 65. Other computer systems suitable for use with the invention may include additional or fewer subsystems. For example, another computer system could include more than one processor 51 (i.e., a multi-processor system), or a cache memory.

The system bus architecture of computer system 1 is represented by arrows 67. However, these arrows are illustrative of any interconnection scheme serving to link the subsystems. For example, a local bus could be utilized to connect the central processor to the system memory and display adapter. Computer system 1 shown in FIG. 2 is but an example of a computer system suitable for use with the invention. Other computer architectures having different configurations of subsystems may also be utilized.

Figure 3:
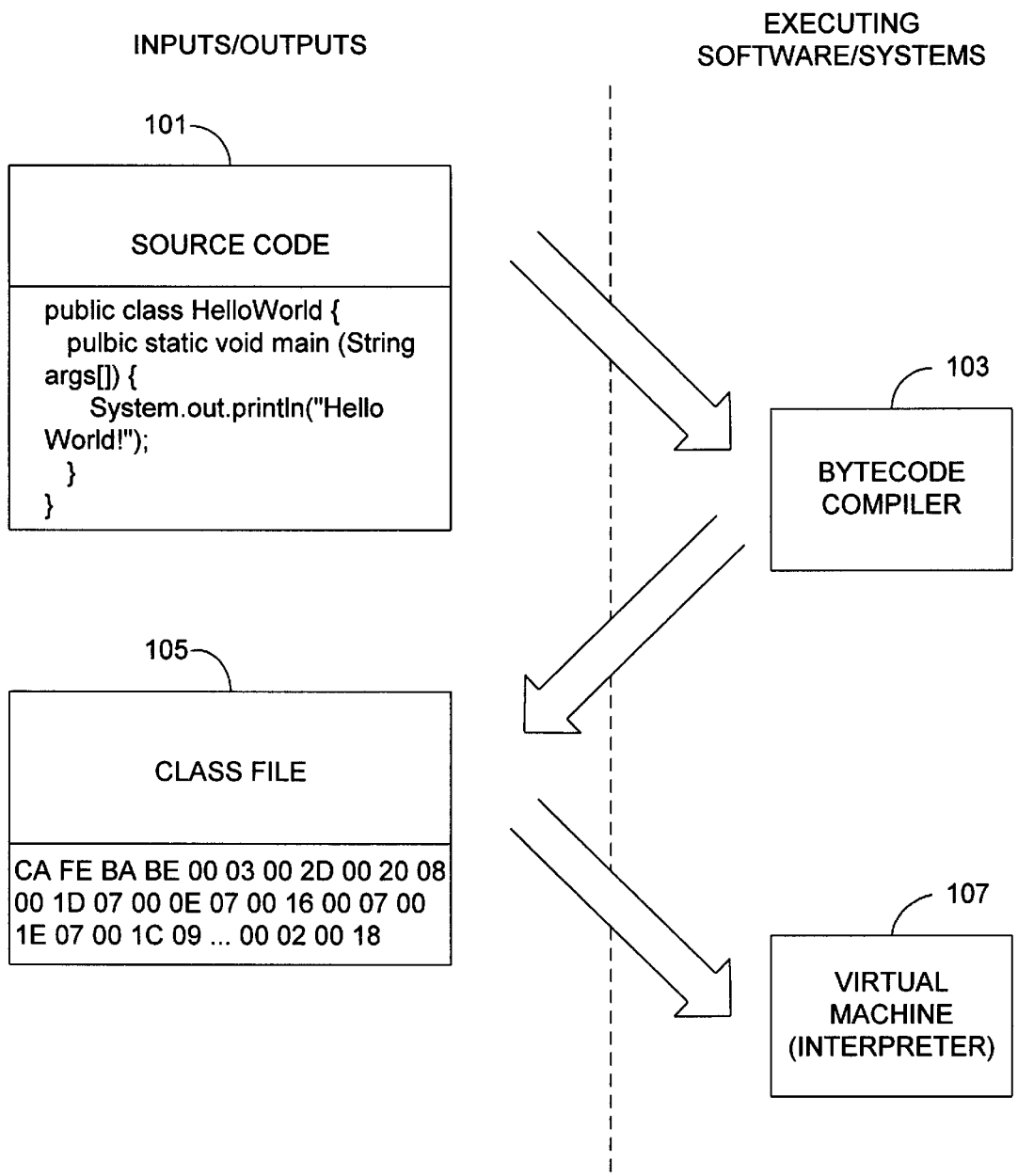
FIG. 3 shows how a Java source code program is executed.

Typically, computer programs written in the Java programming language are compiled into bytecodes or Java virtual machine instructions that are then executed by a Java virtual machine. The bytecodes are stored in class files that are input into the Java virtual machine for interpretation. FIG. 3 shows a progression of a simple piece of Java source code through execution by an interpreter, the Java virtual machine.

Java source code 101 includes the classic Hello World program written in Java. The source code is then input into a bytecode compiler 103 that compiles the source code into bytecodes. The bytecodes are virtual machine instructions as they will be executed by a software emulated computer. Typically, virtual machine instructions are generic (i.e., not designed for any specific microprocessor or computer architecture) but this is not required. The bytecode compiler outputs a Java class file 105 that includes the bytecodes for the Java program.

The Java class file is input into a Java virtual machine 107. The Java virtual machine is an interpreter that decodes and executes the bytecodes in the Java class file. The Java virtual machine is an interpreter, but is commonly referred to as a virtual machine as it emulates a microprocessor or computer architecture in software (e.g., the microprocessor or computer architecture that may not exist in hardware).

Figure 4:
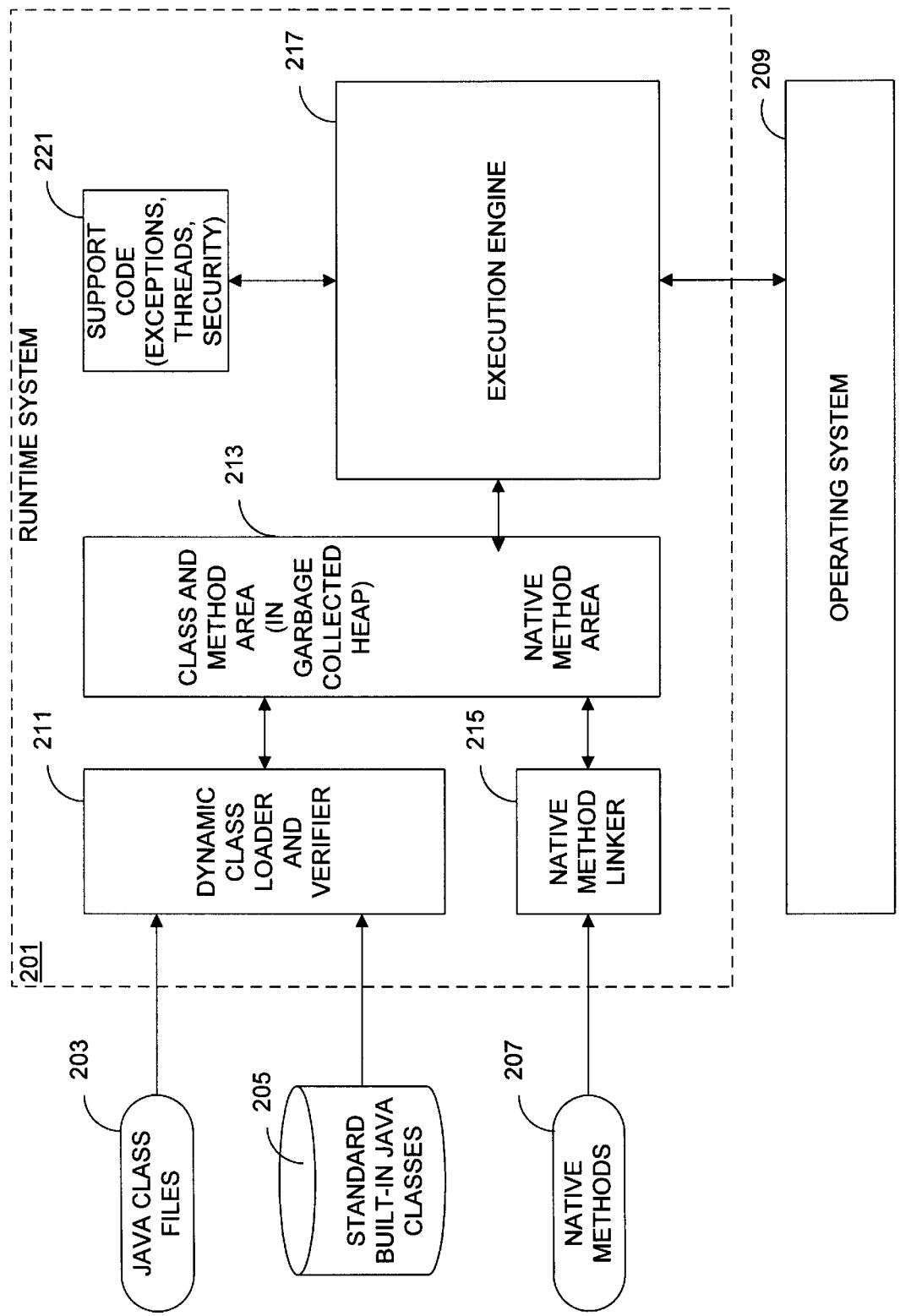
FIG. 4 shows the components of an implementation of a Java runtime system.

FIG. 4 shows the components of an implementation of a Java runtime system. Implementations of the Java virtual machine are known as Java runtime systems. A Java runtime system 201 may receive input of Java class files 203, standard built-in Java classes 205 and native methods 207 in order to execute a Java program. The standard built-in Java classes may be classes for objects such as threads, strings and the like. The native methods may be written in programming languages other than the Java programming language. The native methods are typically stored in dynamic link libraries (DLLs) or shared libraries.

The Java runtime system may also interface with an operating system 209. For example, input/output functions may be handled by the operating system, including providing the Java runtime system with interfaces to Java class files 203, standard built-in Java classes 205 and native methods 207.

A dynamic class loader and verifier 211 loads Java class files 203 and standard built-in Java classes 205 via operating system 209 into a memory 213. Additionally, the dynamic class loader and verifier may verify the correctness of the bytecodes in the Java class files, reporting any errors that are detected.

A native method linker 215 links in native methods 207 via operating system 209 into the Java runtime system and stores the native methods in memory 213. As shown, memory 213 may include a class and method area for the Javi classes and a native method area for native methods. The class and method area in memory 213 may be stored in a garbage collected heap. As new objects are created, they are stored in the garbage collected heap. The Java runtime system, not the application, is responsible for reclaiming memory in the garbage collected heap when space is no longer being utilized.

At the heart of the Java runtime system shown in FIG. 4 is an execution engine 217. The execution engine carries out the instructions stored in memory 213 and may be implemented in software, hardware or a combination of the two. The execution engine supports object-oriented applications and conceptually, there are multiple execution engines running concurrently, one for each Java thread. Execution engine 217 may also utilize support code 221. The support code may provide functionality relating to exceptions, threads, security, and the like.

As a Java program executes, functions are sequentially called within each thread. For each thread there is an execution stack which stores frames for each of the functions that have not completed execution. A frame stores information for execution of the function, such information may include state variables, local variables and an operand stack. As a function is called, a frame for the function is pushed on the execution stack. When the function terminates, the function's frame is popped off the execution stack. Accordingly, only the function corresponding to the frame on the top of the execution stack is active, the functions that correspond to frames below the top of the execution stack have had their execution suspended until the function they called returns (i.e., terminates).

Figure 5:
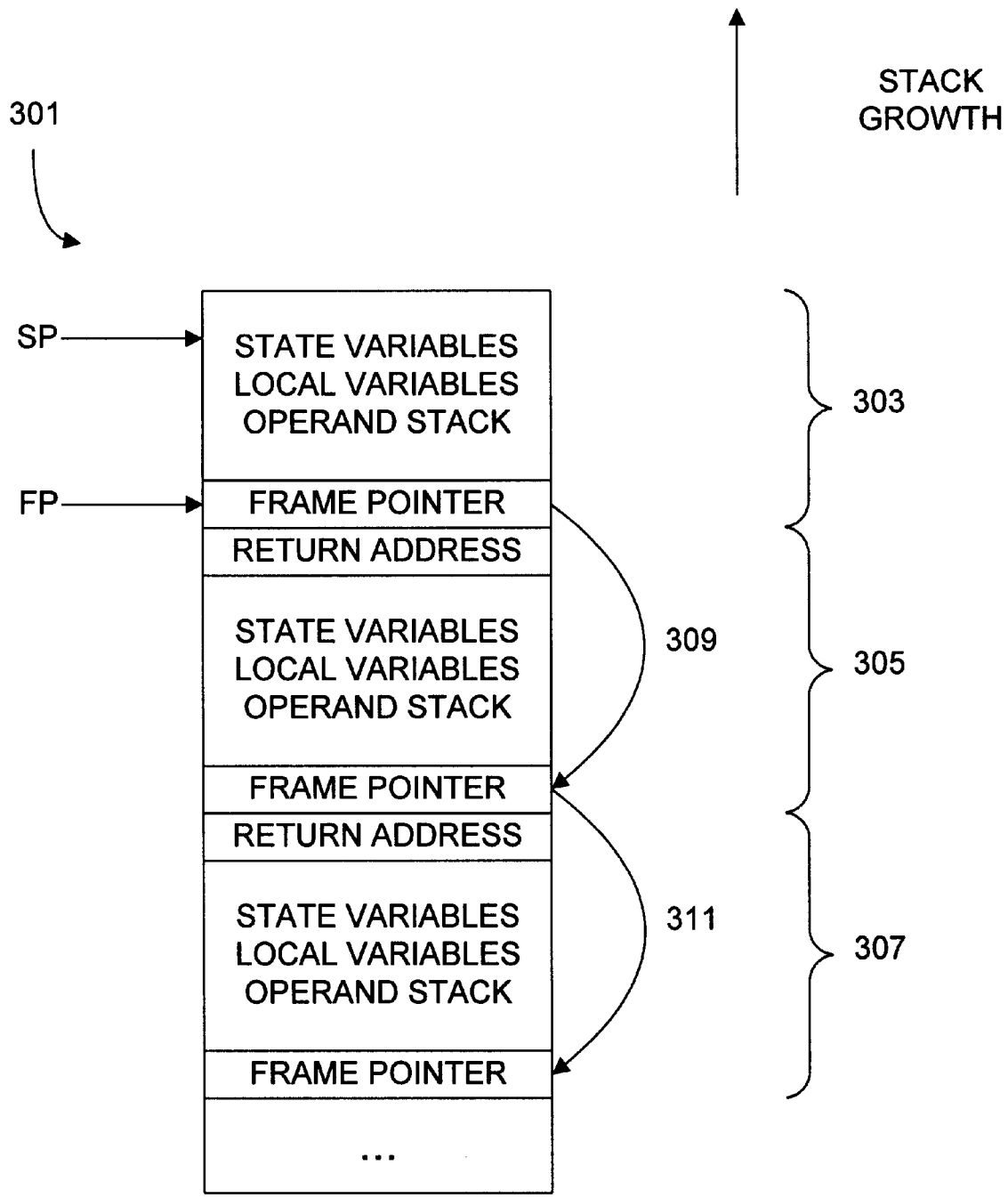
FIG. 5 illustrates frames for functions that are stored on a Java stack.

FIG. 5 illustrates frames for Java functions that are stored on an execution stack. An execution stack 301 is shown having a frame 303 on the top of the execution stack and frames 305 and 307 stored below frame 303, respectively. A stack pointer SP points to the top of the execution stack while a frame pointer FP points to a frame pointer in the frame on the top of execution stack 301.

Each frame is shown to include state variables, local variables and an operand stack for the function corresponding to the frame. Additionally, the last item stored in the frame is a frame pointer which points to the frame pointer in the frame below the current frame on the execution stack as shown by arrows 309 and 311. Although the execution stack that stores frames for native methods may look different, the basic principles are typically similar to the execution stack shown.

Analyzing Run-Time Execution

Figure 6:
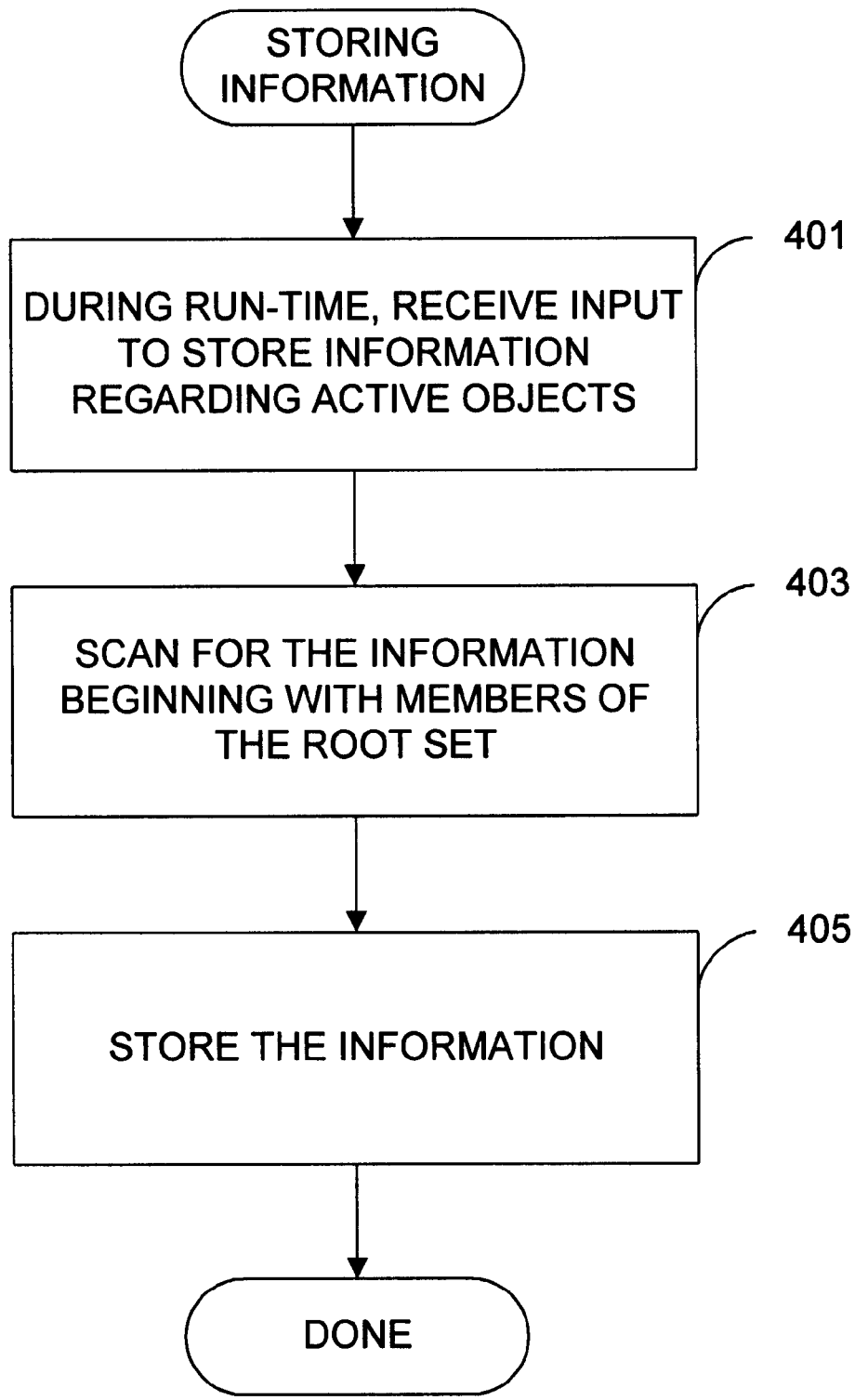
FIG. 6 shows a process of storing information regarding active objects obtained during run-time.

In order to analyze the execution of a Java program, the user executes the program with a Java virtual machine. The virtual machine is responsible for interpreting the Java program, and compilation may be performed for increased efficiency. FIG. 6 shows a process of storing information regarding active objects obtained during run-time of a Java program.

At a step 401, the system receives input during run-time to store information regarding active objects. For example, the user may depress certain keystrokes (e.g., <control>\) to indicate to the system that information regarding active objects should be stored.

The system then scans for the requested information beginning with members of the root set at a step 403. Objects that are members of the root set may be directly referenced. For example, in preferred embodiments, objects that are members of the root set may be referenced by static data members of a Java class, referenced locally by the Java or native execution stack, or referenced globally by native code (global Java Native Interface reference). The system may start with objects that are members of the root set and recursively follow references to any other objects referenced by members of the root set. Thus, all objects that are members of the root set or may be referenced directly or indirectly from the members of the root set will be identified (i.e., transitive closure of reachable objects from the root set). These objects are the active objects at this point in time. In preferred embodiments, a mark and sweep algorithm is utilized similar to a garbage collection algorithm.

Once the active objects are identified, the system stores information about the objects at a step 405. The information may include an id of the object, flags indicating if the object is a member of the root set and why (e.g., referenced by static data members of a Java class), a thread id if applicable, class id, data of the object, and the like. Information that is stored in preferred embodiments is shown in FIGS. 18A–18B. In a Java program, objects of the class Class store the structure of other objects (i.e., the structure of all objects of a specific class) so the information regarding the active objects may include objects that define the structure of other objects.

The information regarding active objects may be stored in a file or any other computer storage (e.g., memory). The information may be stored when an active object is identified or subsequently all at one time. Therefore, the steps in the flowcharts are shown for illustration purposes and one of skill in the art would readily recognize that steps may be combined, deleted or inserted in other embodiments. Although the information may be analyzed during run-time, it is typically analyzed after the program finishes execution.

Figure 7:
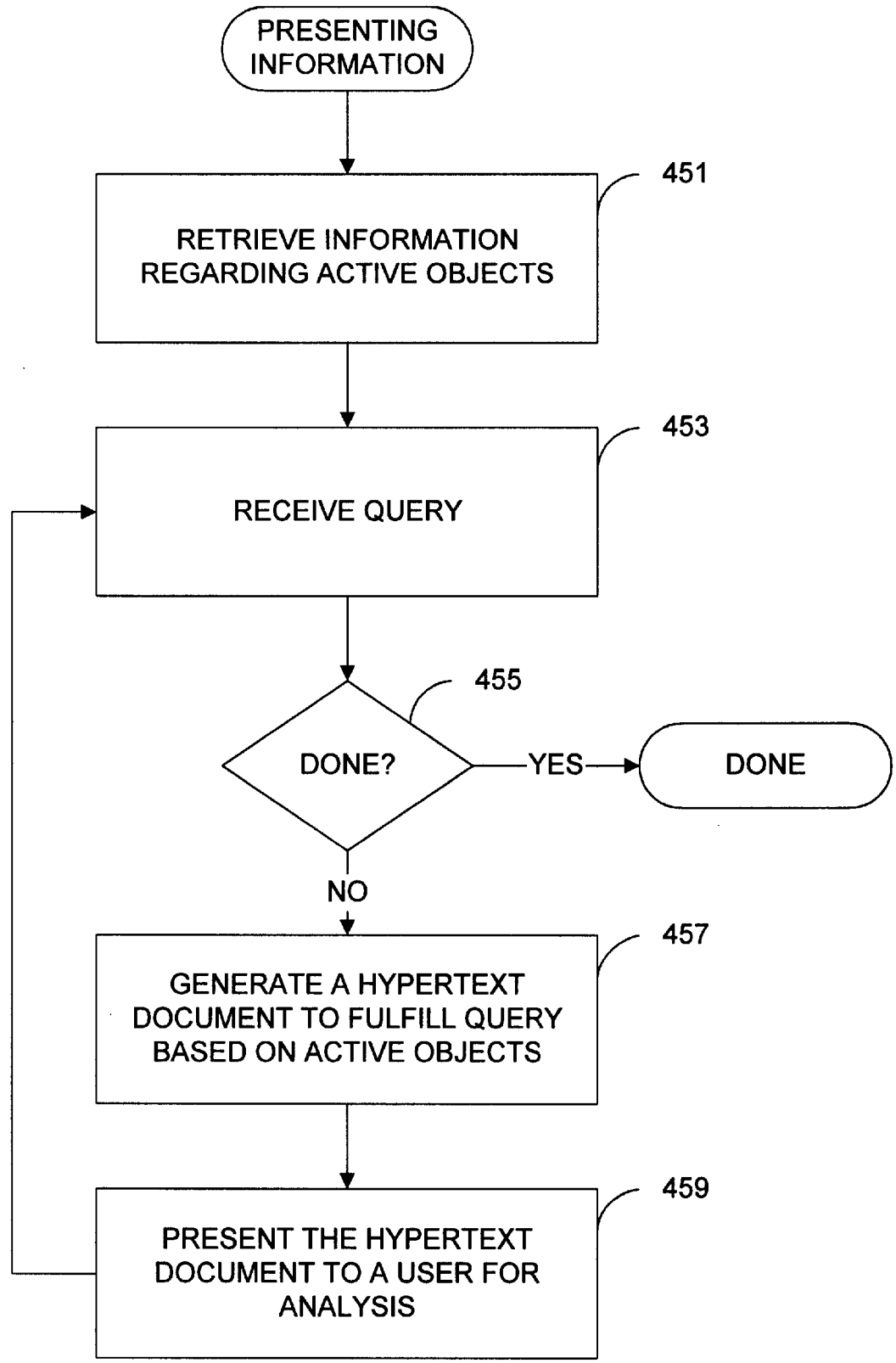
FIG. 7 shows a process of presenting information regarding active objects obtained during run-time.

FIG. 7 shows a process of presenting information regarding active objects obtained during run-time. At a step 451, the system retrieves stored information regarding active objects. The information may include not only information about the active objects themselves, but also their relationships to each other. The relationships between active objects may resemble a directed graph structure that begins with members of the root set and typically proceeds to other objects through various levels of indirection. Thus, active objects that are not members of the root set may be identified by following references from a member of the root set in a manner similar to step 403 of FIG. 6.

Once the information regarding the active objects is retrieved, the system receives a user query at a step 453. In a preferred embodiment, the query is specified as a Uniform Resource Locator (URL) into a HyperText Transport Protocol (HTTP) server. The following will describe queries that may be available.

An "All Classes Query" shows all of the classes that were present on the heap at run-time. The classes may be sorted by their fully-qualified class name and organized by package. An example of the results of this query is shown in FIGS. 8A–8E.

A "Class Query" shows information about a desired class. The information may include the superclass, any subclasses, instance data members, and static data members. An example of the results of this query are shown in FIG. 9.

Figures 10, 11:
FIG. 10 shows a hypertext document of instances of a class excluding subclasses.
FIG. 11 shows a hypertext document of instances of a class including subclasses.

An "Instances Query" shows all the instances of a specified class. An example of the results of this query are shown in FIG. 10.

An "Object Query" shows information about an object that was on the heap at run-time. Most notably, one may navigate to objects that refer to this object, which may be utilized to track down errors. An example of the results of this query are shown in FIG. 12.

A "Roots Query" provides the reference chains from to root set to a specific object. A chain will be provided from each member of the root set from which the object of interest is reachable. In preferred embodiments, the chains are calculated by a depth-first search in order to reduce the length of the chains. Other search techniques may also be utilized. The "Roots Query" is very valuable query for tracking down memory leaks as it may be utilized to determine why an object is still active. An example of the results of this query are shown in FIG. 13.

A "Reachable Objects Query" shows the transitive closure of all objects that are reachable from a specific object. This query may be useful for determining the total run-time footprint of an object in memory. An example of the results of this query are shown in FIG. (after FIG. 12).

An "All Roots Query" shows all the members of the root set. An example of the results of this query are shown in FIGS. 16A–16E.

Unless the query indicates the user is finished at a step 455, the system generates a hypertext document or documents to present the information that fulfills the query at a step 455. A hypertext document includes links to other portions of the document or other documents altogether. In preferred embodiments, the hypertext document(s) is/are written in the HyperText Markup Language (HTML).

At a step 459, the system presents the hypertext document to a user for analysis. This may be done by creating an HTTP server for presenting an HTML document viewable with a Web browser.

The above has described embodiments of the invention but it may be helpful for the reader to see examples of the data that may be presented to a user for analysis. Once a snapshot of information regarding active objects is taken and put in an HTML document. A user may utilize a Web browser to analyze the information. A good starting point may be a query to show all the classes that had instances that were active.

FIGS. 8A–8E show a hypertext document of all classes that had instances that were active when the snapshot was taken. As shown, the class are organized by package. The words that are underlined represent hypertext links to other HTNIL documents. As an example, a link 503 in FIG. 8D may be selected to see more details about the class jovial.slotCar.track.TrackSegment.

FIG. 9 shows a hypertext document of a class that had instances that were active when the snapshot was taken, which is in this case the class jovial.slotCar.track.TrackSegment. Thus, if a user "clicked" on link 503, the user would see the hypertext document shown in FIG. 9. As shown, information such as superclass, subclasses, instance data members, and static data members may be present with hypertext links to more detailed information.

At the bottom of the hypertext document in FIG. 9, a user may request to see the active instances of the class by a link 553 that excludes subclasses or a link 575 that includes subclasses. In other words, link 553 will show all instances of the class jovial.slotCar.track.TrackSegment but will not include instances of subclasses of this class. Link 575 will show all instances of the class jovial.slotCar.track.TrackSegment including instances of subclasses of this class (e.g., classes jovial.slotCar.track.CurvedTrackSegment and jovial.slotCar.track.StraightTrackSegment).

FIG. 10 shows a hypertext document of instances of a class excluding subclasses. Although the hypertext document would not be the one presented when link 553 is selected, it nevertheless represents an example of how the hypertext document may appear. As shown, there are two instances of class jovial.slotCar.Car that were located at the specified memory locations. If a user would like to analyze more information about either of these instances, the links may be selected. A link 607 will be described in more detail in reference to FIG. 12.

FIG. 11 shows a hypertext document of instances of a class including subclasses. This figure shows what may be presented if a user clicked on link 575 of FIG. 9. Since instances of subclasses are shown, some of the instances may include more data or functions than jovial.slotCar.track.TrackSegment. However, all these instances will inherit from this parent class.

FIG. 12 shows a hypertext document of information regarding an active object. The active object is the one that may be selected by link 607 in FIG. 10. As shown, the class, instance data members, references to the object, and reference chains from the root set may be presented. As an example, a link 635 would show reference chains from the root set excluding weak references and a link 675 would show reference chains from the root set including weak references. A weak reference is a reference that the garbage collector may remove if more memory or heap space is needed. A link 681 would show all objects that are reachable (or referenced) by this object.

FIG. 13 shows a hypertext document of root set references to an active object that excludes weak references whereas FIG. 14 shows a hypertext document of root set references to an active object that includes weak references. Although no weak references are shown, a link 691 in FIG. 13 would allow a user to switch to FIG. 14 while a link 693 in FIG. 14 would allow the user to switch back.

FIGS. 15A and 15B show a hypertext document of all the objects that are reachable from an active object. This may be displayed when a user activates link 681 of FIG. 12. The objects may be identified by searching a directed graph of active objects.

Referring back to FIG. 8E, a link 705 allows a user to request to see all the members of the root set. FIGS. 16A–16E shows a hypertext document of all members of the root set that may be presented if link 705 is activated. As shown, the members of the root set may be organized according to how the members are referenced. For example, by Java static references, Java local references, native static references, and native local references. A link 715 in FIG. 16E allows a user to request aLl the classes that had active instances, such as FIGS. 8A–8E.

The hypertext document examples illustrate that a user may easily analyze the active objects in preferred embodiments. However, the invention is not limited to presentation by hypertext documents and one of skill in the art would realize other methods may be utilized.

In order to further understand the invention, it may be helpful to describe a scenario where a user would perform analysis of a Java program. Memory leaks are a pervasive problem in almost any programming language. A memory leak generally refers to memory that has been allocated but is no longer being used by a computer program. In worst case scenarios, memory leaks result in memory allocation errors because there is not enough available memory. A memory leak may be due to programmer error when there is a reference from the root set to an object in the heap that is no longer needed.

Assume a user suspects that there is a memory leakage problem. The user may count the number of instances of a class that should be active at a certain run-time. The user may then generate a snapshot of active objects according to an embodiment of the invention. The user may then analyze the stored information to determine how many instances were active. If there are more than expected, the user may follow the references from the errant active objects to determine what object is maintaining an erroneous reference.

Figure 17:
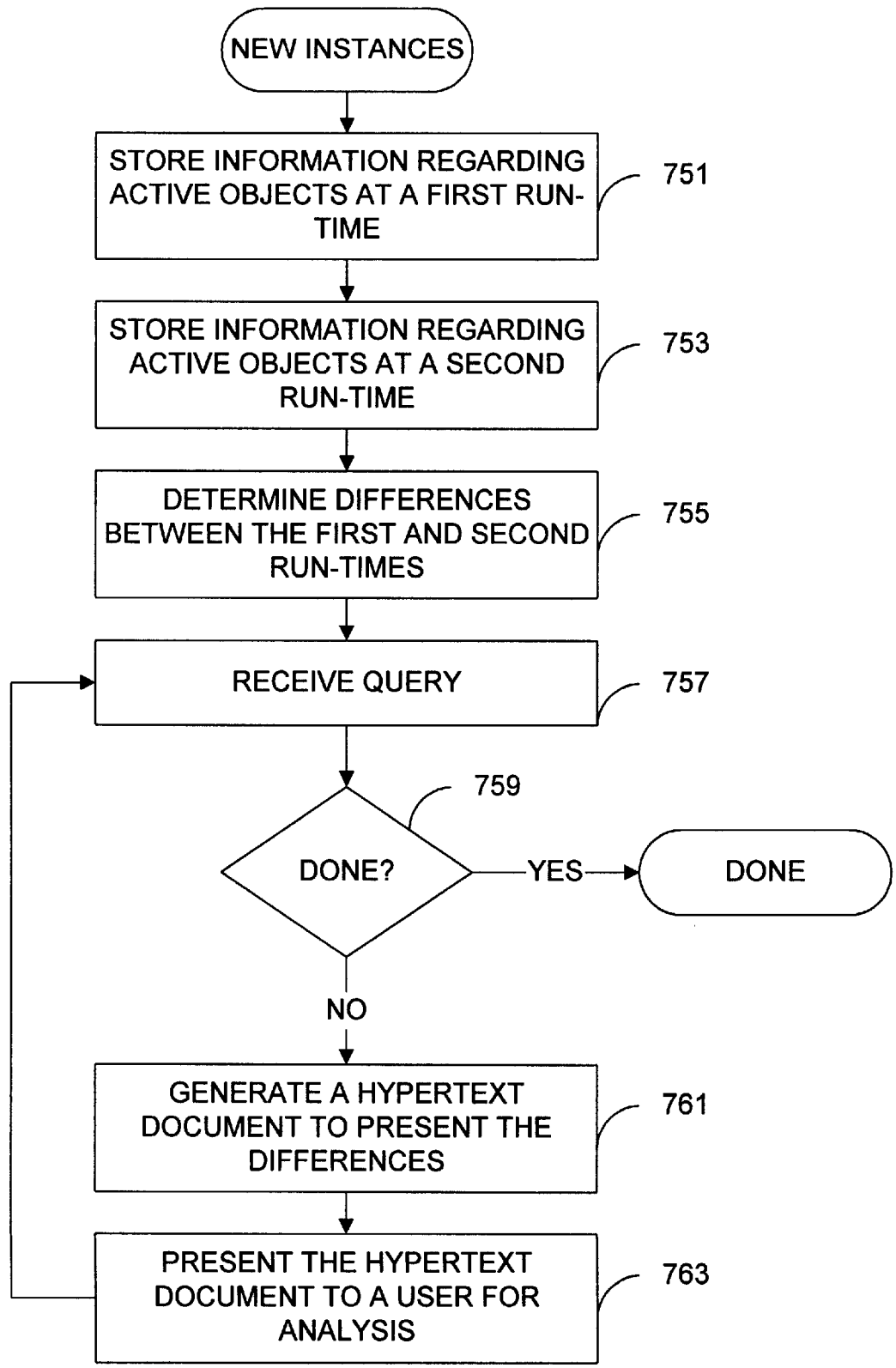
FIG. 17 shows a process of determining differences (e.g., new instances) between active objects at two different run-times.

Additionally, embodiments of the invention allow a user to compare snapshots of active objects. FIG. 17 shows a process of determining differences (e.g., new instances) between active objects at two different run-times.

At a step 751, the system stores information regarding active objects at a first run-time. Subsequently at a step 753, the system stores information regarding active objects at a second run-time. The system may be instructed to store the information by user input as described above.

A user may instruct the system to determine differences between the first and second run-times at a step 755. For example, the user may specify the files that store the snapshots at the two run-imes. The system may then compare the snapshots and determine the differences between the snapshots, such as what new instances are present at the second run-time.

Once the differences between the first and second run-times is determined, the system receives a user query at a step 757. In addition to the queries described above, a "New Instances Query" may be available that shows only new instances in the second run-time. An instance may be considered "new" if it is in the first snapshot but there is no object with the same id in the second snapshot. An object's id may be a 32-bit integer (or handle) that is assigned by the virtual machine and uniquely identifies the object. Although handles may be re-used, snapshots that are taken within relatively short time intervals generally produce excellent results. An example of the results of this query are shown in FIG. 18.

Unless the query indicates the user is finished at a step 759, the system generates a hypertext document or documents to present the information that fulfills the query (e.g., the differences between the two snapshots) at a step 761. The system may present the hypertext document to a user for analysis at a step 763, typically by creating an HTTP server for presenting an HTML document viewable with a Web browser.

A hypertext document of new instances of a class is shown in FIG. 18. As shown, a link 801 allow a user to see more details about the class and links 803 allow a user to see more details about the new instances. In the hypertext document of FIG. 18, subclasses are not shown. FIG. 19 shows a hypertext document of new instances of a class that includes subclasses, of which there are no additional instances in this example.

During debugging, it may be beneficial to analyze how a computer program changes over time. With embodiments of the invention, a user is not only able to take multiple snapshots of active objects during run-time, but is also able to have the system compare snapshots and present differences for further analysis.

To this point, the specific details about how the information regarding active objects may be stored. FIGS. 20A–20B describe a data structure that may be utilized to store information regarding active objects in preferred embodiments. A binary object dump (BOD) file may be stored according to the structure specified in these figures. Although this structure may be utilized in preferred embodiments, other structures may be utilized without departing from the spirit of the invention.

Figure 21:
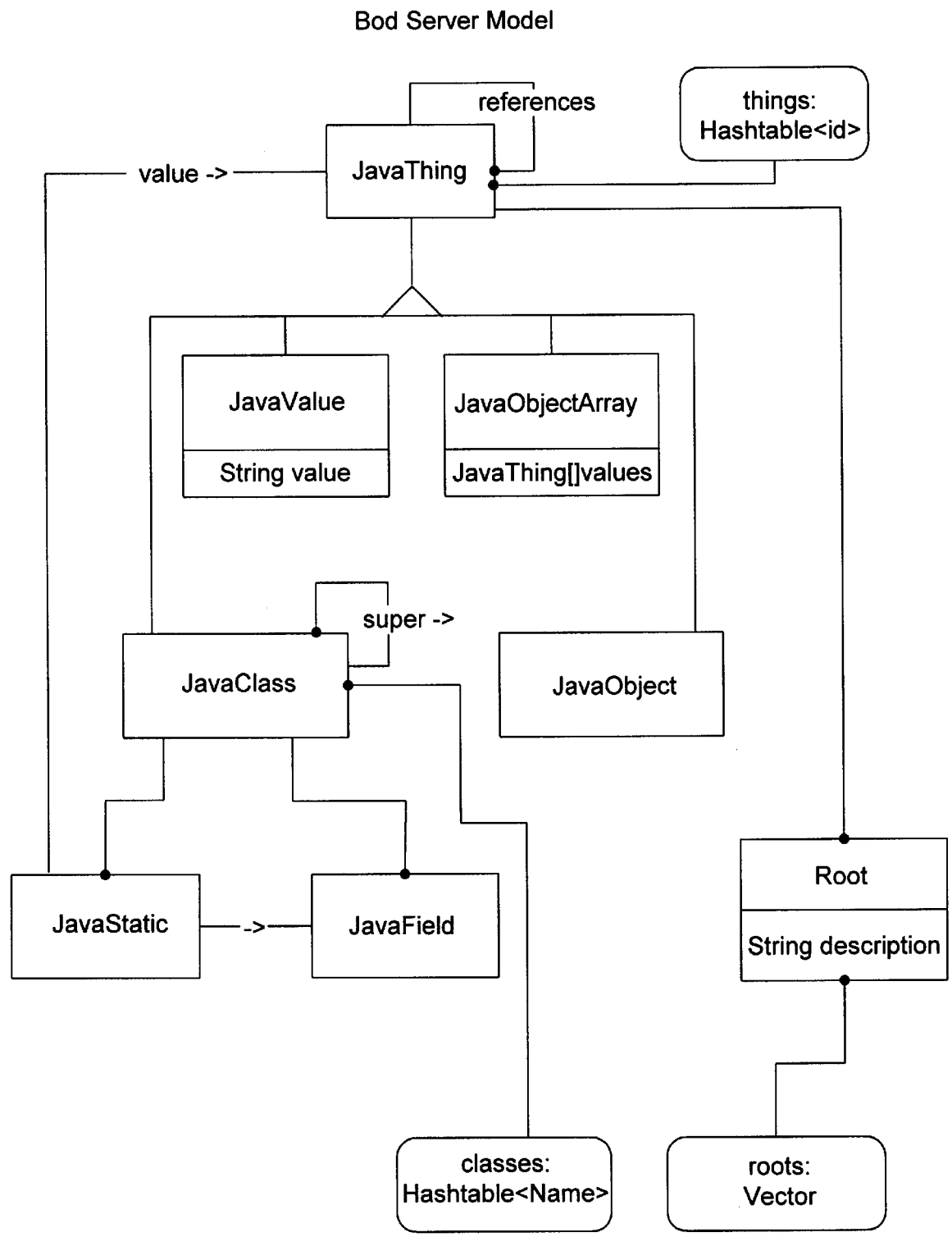
FIG. 21 shows an embodiment of a BOD server.

FIG. 21 shows a model part of a BOD server. When the server is started, it reads a BOD file and builds the structure shown in memory. The top level of this structure is an instance of Snapshot (the objects shown are data members of Snapshot). When a user requests information, the server treats the snapshot as a read-only representation of the contents of the heap.

CONCLUSION

While the above is a complete description of preferred embodiments of the invention, there is alternatives, modifications, and equivalents may be used. It should be evident that the invention is equally applicable by making appropriate modifications to the embodiments described above. For example, the embodiments described have been in reference to a Java virtual machine, but the principles of the present invention may be readily applied to other systems and languages. Therefore, the above description should not be taken as limiting the scope of the invention that is defined by the metes and bounds of the appended claims along with their full scope of equivalents.

What is claimed is:

1. In a computer system, a method for analyzing tlie execution of object-oriented programs, the method comprising:

receiving input during run-time of the object-oriented program to store information regarding active objects;

scanning for the active objects beginning with objects that are members of a root set of objects; and storing the information regarding active objects.

2. The method of claim 1, wherein scanning for the active objects includes scanning for objects that are referenced by an object in the root set of objects for the information regarding active objects.

3. The method of claim 1, wherein storing the information regarding active objects includes storing information regarding objects in the root set of objects and objects that are referenced by an object in the root set of objects.

4. The method of claim 1, wherein the information regarding active objects includes an indication of the objects that are members of the root set of objects.

5. The method of claim 1, wherein each object in the root set of objects is referenced by a static data member, a local reference from a stack or a reference from native code.

6. The method of claim 1, wherein the active objects include objects that define the structure of other objects.

7. The method of claim 1, wherein the information regarding objects that are active objects are stored in a file.

8. The method of claim 1, wherein the active objects include instances of Java classes.

9. A computer program product for analyzing the execution of object-oriented programs, comprising:
   computer code that receives input during run-time of the object-oriented program to store information regarding active objects;
   computer code that scans for the active objects beginning with objects that are members of a root set of objects;
   computer code that stores the information regarding active objects; and
   a computer readable medium that stores the computer codes.

10. The computer program product of claim 9, wherein the computer code that scans for the information regarding active objects includes computer code that scans for objects that are referenced by an object in the root set of objects.

11. The computer program product of claim 9, wherein the computer code that stores the information regarding active objects includes computer code that stores information regarding objects in the root set of objects and objects that are referenced by an object in the root set of objects.

12. The computer program product of claim 9, wherein the information regarding active objects includes an indication of the objects that are members of the root set of objects.

13. The computer program product of claim 9, wherein each object in the root set of objects is referenced by a static data member, a local reference from a stack or a reference from native code.

14. The computer program product of claim 9, wherein the active objects include objects that defme the structure of other objects.

15. The computer program product of claim 9, wherein the information regarding objects that are active objects are stored in a file.

16. The computer program product of claim 9, wherein the active objects include instances of Java classes.

17. The computer program product of claim 9, wherein the computer readable medium is selected from the group consisting of CD-ROM, floppy disk, tape, flash memory, system memory, hard drive, and data signal embodied in a carrier wave.

18. In a computer system, a method for analyzing the execution of object-oriented programs, the method comprising:
   retrieving information regarding active objects at a first point in time of the execution of an object-oriented program;
   generating a hypertext document to present the information regarding active objects; and
   presenting the hypertext document to a user for analysis.

19. The method of claim 18, further comprising retrieving information regarding active objects at a second point in time of the execution of an object-oriented program.

20. The method of claim 19, further comprising determining differences between active objects at the first and second points in time.

21. The method of claim 20, wherein the differences include active objects that are present at the second point in time but not at the first point in time.

22. The method of claim 18, wherein the active objects includes instances of Java classes.

23. The method of claim 18, wherein the hypertext document is written in the HyperText Markup Language (HTML).

24. The method of claim 18, wherein generating a hypertext document includes generating at least one link within the hypertext document and at least one link that references a separate document.

25. In a computer system, a method for analyzing the execution of object-oriented programs, the method comprising:
   retrieving information regarding active objects at a first point in time of the execution of an object-oriented program;
   generating a hypertext document to present the information regarding active objects, wherein generating the hypertext document includes generating at least one link within the hypertext document and at least one link that references a separate document, and wherein the hypertext document is written in a HyperText Markup Language; and
   presenting the hypertext document to a user for analyis, wherein presenting the hypertext document to a user for analysis includes creating a HyperText Transport Protocol server for presenting the hypertext document.

26. The method of claim 18, wherein retrieving information regarding active objects includes retrieving information about relationships between at least some of the active objects.

27. The method of claim 18, wherein generating a hypertext document to present the information regarding active objects includes generating the hypertext document to present the information regarding only the active objects and relationships between the active objects.

28. A computer program product for analyzing the execution of object-oriented programs, comprising:
   computer code that retrieves information regarding active objects at a first point in time of the execution of an object-oriented program;
   computer code that generates a hypertext document to present the information regarding active objects;
   computer code that presents the hypertext document to a user for analysis; and
   a computer readable medium that stores the computer codes.

29. The computer program product of claim 28, further comprising computer code that retrieves information regarding active objects at a second point in time of the execution of an object-oriented program.

30. The computer program product of claim 29, further comprising computer code that determines differences between active objects at the first and second points in time.

31. The computer program product of claim 30, wherein the differences include active objects that are present at the second point in time but not at the first point in time.

32. The computer program product of claim 28, wherein the active objects includes instances of Java classes.

33. The computer program product of claim 28, wherein the hypertext document is written in the HyperText Markup Language (HTML).

34. The computer program product of claim 28, wherein the computer readable medium is selected from the group consisting of CD-ROM, floppy disk, tape, flash memory, system memory, hard drive, and data signal embodied in a carrier wave.

35. In a computer system, a method for analyzing the execution of object-oriented programs, the method comprising:
   during run-time of an object-oriented program, storing information regarding active objects at first and second points in time of the execution of the object-oriented program;
   retrieving the information regarding active objects at the first and second points in time of the execution of the object-oriented program;

determining differences between active objects at the first and second points in time;

generating a hypertext document to present the differences between active objects at the first and second points in time; and presenting the hypertext document to present the differences between active objects at the first and second points in time to a user for analysis.

36. A computer program product for analyzing the execution of object-oriented programs, comprising:

computer code that, during run-time of an object-oriented program, stores information regarding active objects at first and second points in time of the execution of an object-oriented program;

computer code that retrieves the information regarding active objects at the first and second points in time of the execution of an object-oriented program;

computer code that determines differences between active objects at the first and second points in time;

computer code that generates a hypertext document to present the differences between active objects at the first and second points in time; and computer code that presents the hypertext document to present the differences between active objects at the first and second points in time to a user for analysis; and a computer readable medium that stores the computer codes.

37. The computer program product of claim 36, wherein the computer readable medium is selected from the group consisting of CD-ROM, floppy disk, tape, flash memory, system memory, hard drive, and data signal embodied in a carrier wave.

38. In a computer system, a method for analyzing the execution of object-oriented programs to identify memory leaks associated with the computer system, the method comprising:

receiving input during run-time of the object-oriented program to store information regarding active objects;

scanning for the active objects beginning with objects that are members of a root set of objects;

storing the information regarding active objects; and analyzing the stored information to identify any memory leaks associated with the computer system.

39. The computer system of claim 38, wherein analyzing the stored information includes determining when too many active objects of a particular type are in existence.

40. A computer program product for analyzing the execution of object-oriented programs, comprising:

computer code that receives input during run-time of the object-oriented program to store information regarding active objects;

computer code that scans for the active objects beginning with objects that are members of a root set of objects;

computer code that stores the information regarding active objects;

computer code that analyzes the stored information to identify any memory leaks associated with the computer system; and a computer readable medium that stores the computer codes.

41. In a computer system, a method for analyzing the execution of object-oriented programs to identify potential memory leaks in the computer system, the method comprising:

during run-time of an object-oriented program, storing information regarding active objects at first and second points in time of the execution of the object-oriented program;

retrieving the information regarding active objects at the first and second points in time of the execution of the object-oriented program;

determining differences between active objects at the first and second points in time, the differences being arranged to indicate a substantially excessive number of active objects of a particular type, wherein the substantially excessive number of active objects of the particular type indicate potential memory leaks;

generating a hypertext document to present the differ(nces between active objects at the first and second points in time; and presenting the hypertext document to present the differences between active objects at the first and second points in time to a user for analysis to identify substantially unnecessary active objects.

42. A computer program product for analyzing the execution of object-oriented programs to identify potential memory leaks in a computer system, the computer program product comprising:

computer code for storing information regarding active objects at first and second points in time of the execution of an object-oriented program during run-time of the object-oriented program;

computer code for retrieving the information regarding active objects at the first and second points in time of the execution of the object-oriented program;

computer code for determining differences between active objects at the first and second points in time, the differences being arranged to irdicate a substantially excessive number of active objects of a particular type, wherein the substantially excessive number of active objects of the particular type indicate potential memory leaks;

computer code for generating a hypertext document to present the differences between active objects at the first and second points in time;

computer code for presenting the hypertext document to present the differences between active objects at the first and second points in time to a user for analysis to identify substantially unnecessary active objects; and a computer readable medium that stores the computer codes.

43. A method for identifying potential memory leaks associated with the computer system, the method comprising:

during run-time of an object-oriented program written in the Java language, storing information regarding active objects at first and second points in time of the execution of the object-oriented program;

retrieving the information regarding active objects at the first and second points in time of the execution of the object-oriented program;

determining differences between active objects at the first and second points in time, the differences being arranged to indicate a substantially excessive number of active objects of a particular type, wherein the substantially excessive number of active objects of the particular type indicate potential memory leaks;

generating a hypertext document to present the differences between active objects at the first and second points in time; and analyzing the hypertext document, wherein analyzing the hypertext document includes analyzing the differences between active objects at the first and second points in time to identify objects which are substantially new instances of classes as of the second point in time.

44. The method of claim 43, wherein analyzing the hypertext document further includes:

determining when a substantially excessive number oi new instances of a particular class are in existence; and following references to the new instances of the particular class to determine sources of potential memory leaks.

* * * * *